Figure 1:
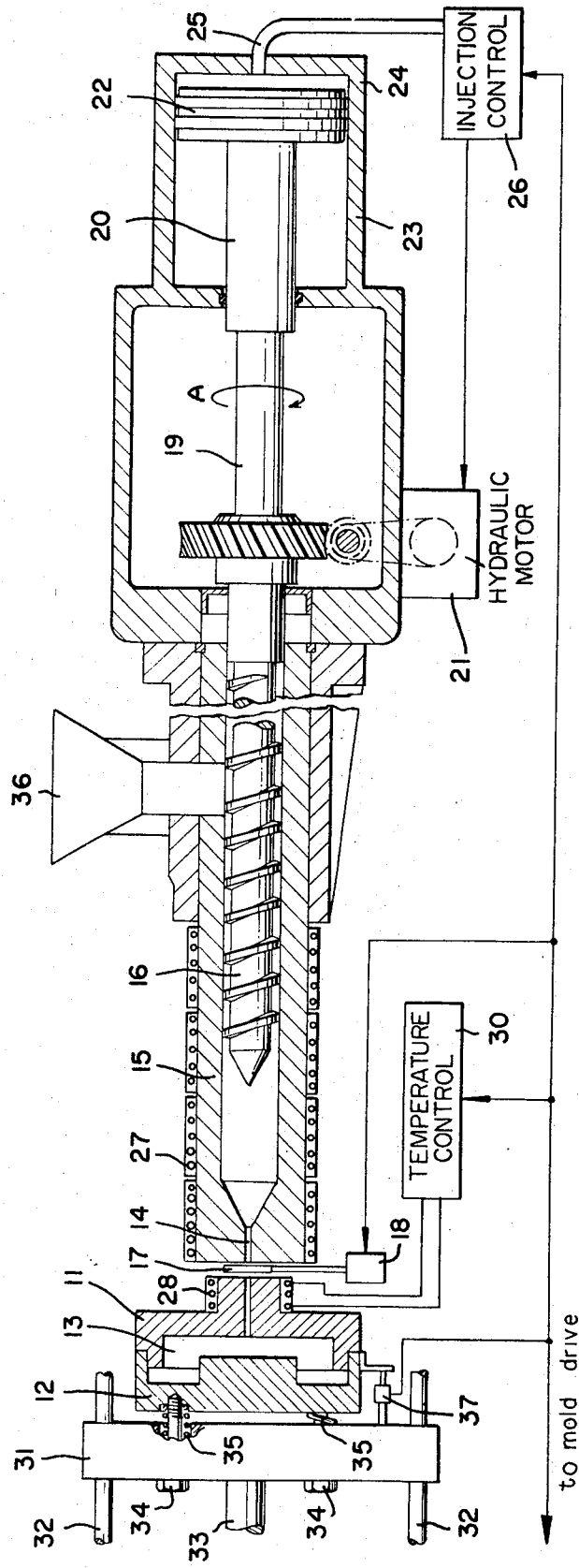

United States Patent [19]
Bielfeldt et al.

[11] 3,773,451
[45] Nov. 20, 1973

[54] SCREW-TYPE INJECTION-MOLDING MACHINE

[75] Inventors: Friedrich Bernd Bielfeldt, Jurgen Neureuther, both of Germany

[73] Assignee: Firma Eckert & Ziegler GmbH, Weissenburg, Germany

[22] Filed: June 28, 1971

[21] Appl. No.: 166,912

[52] U.S. Cl................ 425/147, 264/328, 264/329, 425/242, 425/247
[51] Int. Cl............................................. B29g 3/00
[58] Field of Search................... 425/147, 156, 159, 425/166, 167, 242, 247; 264/328, 329

[56] References Cited
UNITED STATES PATENTS

| | | | |
|---|---|---|---|
| 3,667,884 | 6/1972 | Reinfeld | 425/149 |
| 2,271,063 | 1/1942 | Mattia | 264/308 X |
| 2,996,764 | 8/1961 | Ross et al. | 264/241 |
| 3,235,909 | 2/1966 | McIlvin | 425/147 X |
| 3,329,752 | 7/1967 | Heider | 264/328 X |
| 3,359,601 | 12/1967 | Evans | 264/329 X |
| 3,425,096 | 2/1969 | Morse | 264/329 X |
| 3,436,443 | 4/1969 | Hutchinson | 264/40 |
| 3,495,302 | 2/1970 | Ash et al. | 264/329 X |
| 3,509,601 | 5/1970 | Johansson | 425/147 |
| 3,553,786 | 1/1971 | Bentley | 425/147 X |

*Primary Examiner*—Richard B. Lazarus
*Attorney*—Karl F. Ross

[57] ABSTRACT

An injection-molding machine with a rotatable and axially displaceable feed screw, serving to plasticize the moldable material and thereafter to inject it into a mold, is advanced and retracted repeatedly during a single molding operation to inject the plasticized material in several stages into the mold which is maintained at a relatively low temperature until the mold is filled. The termination of injection and the switchover to curing temperature occurs in response to a slight expansion of the mold upon complete filling.

1 Claim, 2 Drawing Figures

$t_1$ = injection phase
$t_2$ = plasticizing phase
$t_3$ = operating interval $t_1$ = injection phase $t_2$ = plasticizing phase $t_3$ = operating interval

SCREW-TYPE INJECTION-MOLDING MACHINE

This application is a Division of application, Ser. No. 818,275, filed 22 Apr. 1969 abandoned in favor of Streamlined Continuation Ser. No. 157,773 which is now abandoned.

Our present invention relates to an injection-molding machine of the type wherein the moldable plastic material is delivered to one or more cavities of a split mold by a rotatable feed screw which is also axially reciprocable to act as an injection piston.

In the conventional operation of such a machine, the plastic material is supplied (.e.g. in granular form) to an inlet of a cylinder housing the feed screw. As the screw rotates, its helical threads compact the material against an end of the cylinder containing an outlet orifice which leads to a sprue channel terminating at the interior of a stationary mold portion. With the orifice initially blocked so that the resulting back pressure overcomes a biasing force urging the feed screw toward the orifice, the feed screw is progressively repressed until it reaches a limiting position remote from the outlet. This operation plasticises the moldable material. which may also be further softened by the concurrent application of external heat. After the plasticized mass has reached its desired consistency, the feed screw is axially advanced toward the orifice which is concurrently unblocked to enable the injection of the plastic mass into the mold which is closed at this stage. This cycle is then repeated with reclosure of the orifice, hardening of the mass in the mold cavity and subsequently reopening of the mold to discharge the finished article, a new plastification and injection cycle being initiated either before or after such discharge.

The power required to inject the plasticized mass depends primarily on the viscosity of the material and on the quantity thereof to be introduced into the mold cavity or cavities, thus upon the overall volume of the interior of the mold together with that of the sprue channel. If the viscosity is high, as is often the case particularly with thermosetting materials, the friction encountered in the sprue channel and in the narrower passages of the mold itself creates a considerable back pressure which limits the amount of material injectable in one stroke, inasmuch as the product of pressure and stroke length cannot be greater than the available hydraulic or other energy acting upon the feed screw. Though this friction could be significantly reduced in some instances by a widening of the sprue channel, this expedient is unsatisfactory since it leads to the expenditure of more plastic material wastefully remaining in that channel to form the runner. This is particularly true with thermosetting material which, after being cured in the sprue channel, can no longer be usefully recovered.

These difficulties have heretofore restricted the use of molding machines of the aforedescribed type to the manufacture of relatively shallow articles and/or the use of low-viscosity plastic material. The same disadvantages are encountered where the feed screw is axially fixed and the pressure of its rotating threads is relied upon to inject the material.

It is, therefore, the general object of our present invention to provide means in such a machine for enabling the charging of molds of relatively large effective volume with an injector system of limited power incapable of performing this task in a conventional manner.

This object is realized, pursuant to our present invention, by the repetitive injection of plasticized material into the closed mold, each injection cycle filling the mold only partly while utilizing at least a major part of the capacity of the feed screw and the associated injection system. When, upon the last injection, the mold is completely filled, the next advance of the feed screw is allowed to occur only after the injected mass has hardened and the mold has been reclosed after ejection of the molded article. This will often require an interruption of the rotation of the feed screw for a shorter or longer period, depending upon the necessary setting period and the time needed for opening and closing the mold.

If the plastic material is of the heat-curable type, the temperature of the mold should be maintained below the curing point during the progressive charging thereof so that the mass introduced in each injection cycle does not harden prematurely (as by cross-linking) in a mannr which would prevent the homogeneous blending of successively injected portions and which might also block the sprue channel. In such instances, therefore, the temperature of the mold is raised to the curing level only after its cavities are completely filled.

According to another feature of our invention, we provide means for sensing the complete filling of the mold to control the injection and, if necessary, the temperture in the aforedescribed manner. Such sensing means may advantageously comprise a microsensitive switch responsive to a slight expansion of the mold, i.e. a small separation of its relatively movable portions under the pressure of the injected material.

We have found that our present method of operating an injection-molding machine of the aforedescribed type allows the injection pressure to be multiplied without any increase in the power of the screw drive; in a typical system capable of injecting at a pressure of 250 – 400 kp/cm² in a single stroke, the present improvement may enable the realization of injection pressure of 1,200 – 2,000 kp/cm².

Figure 2:
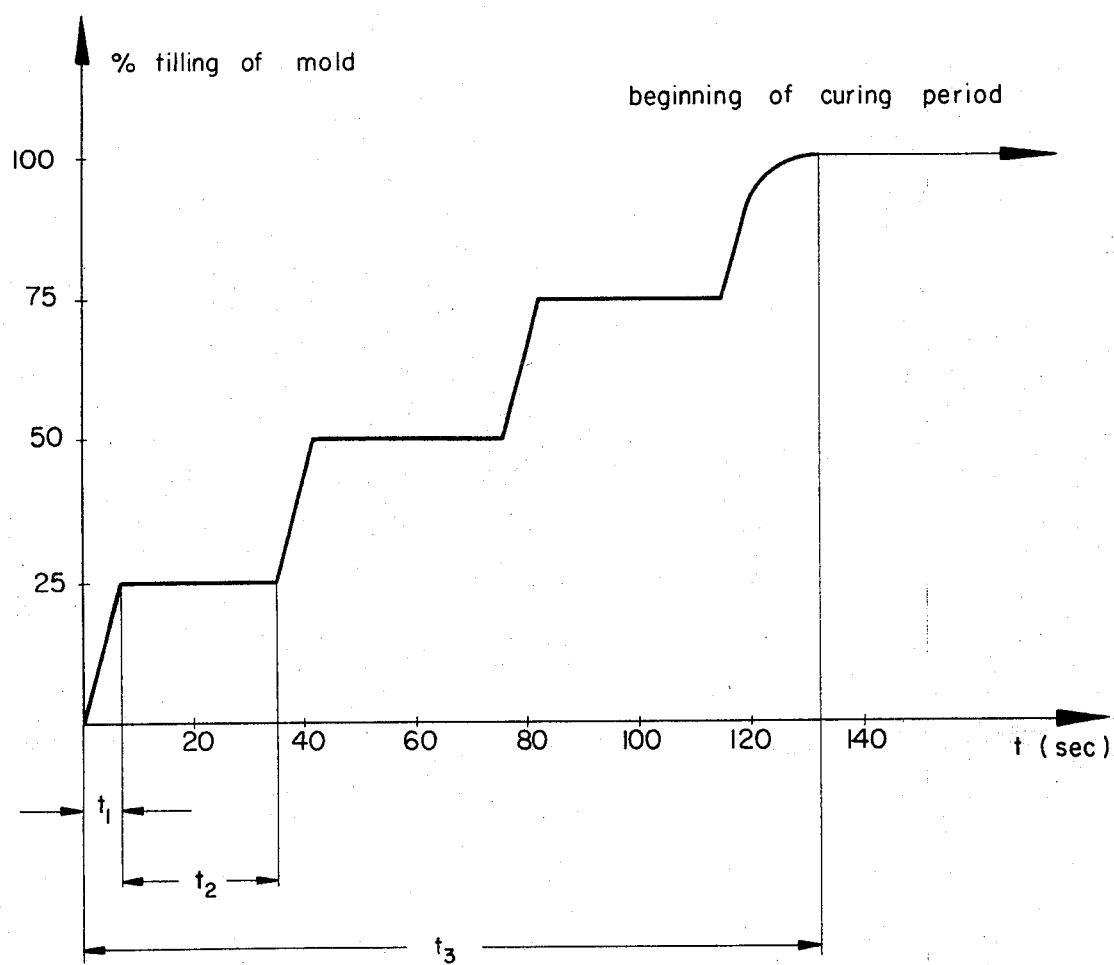

The above and other features of our invention will be described in greater detail with reference to the accompanying drawing in which:

FIG. 1 is a somewhat diagrammatic axial sectional view of part of an otherwise conventional injection-molding machine modified in accordance with our invention; and FIG. 2 is a graph illustrating the method of operating the machine of FIG. 1 embodying the present improvement.

In FIG. 1 we have shown part of an injection-molding machine comprising a stationary mold portion 11 and a movable mold portion 12 together defining a cavity 13. Mold portion 11 is connected, through a sprue channel including an injection orifice 14, with the interior of a cylinder 15 containing a rotatable and axially reciprocable feed screw 16. A gate 17 is operable by an actuator 18, such as a solenoid, to block or unblock the orifice 14.

Feed screw 16 has an unthreaded extension rotatably seated in a coaxial piston 20 which slides in a cylinder 24 provided with a conduit 25 through which hydraulic or other pressure fluid may be admitted under the control of a conventional valve system 26 also permitting the subsequent discharge of this fluid from cylinder 24. A worm gear 23, keyed to screw extension 19 so as to be axially slidable thereon, is in mesh with a worm 22 driven by a hydraulic motor 21 also controlled by valve system 26. Injection cylinder 15 is surrounded by electric heating elements 27, such as coils of resistance wire, energized from a current source not shown. A similar heating element 28 surrounds the sprue channel and orifice 14 and is energized under the control of a switching system 30.

Movable mold portion 12 is shown supported on a backing plate 31 sliding on a set of tie rods 32 under the action of a reciprocating drive means of which only a ram 33 has been illustrated. The connection between plate 31 and mold half 12 is established by a set of bolts 34 surrounded by compression springs 35 which tend to hold the mold portion 12 at a small distance from plate 31. A hopper 36 serves to supply fresh plastic material to the interior of cylinder 15 for plastification and injection into cavity 13 via orifice 14.

A microsensitive switch 37 is closed when the mold portion 12 moves toward its supporting plate 31 upon complete filling of cavity 13 by the injected mass. This switch, in turn, acts upon the injection control 26 and the temperature control 30 to inhibit the advance of feed screw 16 before opening and reclosure of the mold 11, 12 and to increase the rate of energization of heater 28 to raise the temperature of the mold cavity 13 to the curing level.

Motor 21 and injection control 26 may be conventionally actuated by a common timer, not shown, together with gate control 18 and mold drive 33 to advance the feed screw 16 toward orifice 14 at the beginning of each cycle, the screw thereupon beginning to rotate in a direction indicated by arrow A. With gate 17 closed, granular plastic material supplied on hopper 36 is advanced toward the left-hand end of cylinder 15 and is plasticized under heat and pressure as the mass backs up between the threads of screw 16. Meanwhile, the mold 11, 12 previously opened for the discharge of a formed article has been reclosed so that gate 17 can be opened for the first partial injection as soon as sufficient pressure has been built up within cylinder 15. This pressure buildup has meanwhile repressed the screw 16 to the right, against a biasing force supplied by a spring not shown and/or by the residual pressure of operating fluid escaping through a restricted outlet via conduit 25, so that its free end lies at a certain distance from the orifice 14. Next, with the motor 21 preferably stopped to arrest the rotation of screw 16 (through this is not absolutely necessary), fluid pressure is reversed by injection control 26 so that piston 22 advances toward the left whereby screw 16 drives the plasticized mass through orifice 14 into cavity 13.

In accordance with our invention, and as outlined above, it is assumed that the quantity of plastic material injected during this phase is only a fraction of the charge required to fill the mold cavity 13 (or a group of such cavities supplied in parallel from the sprue and orifice 14). Thus, the mold is only partly filled at this instant and the timer reoperates gate control 18 and injection control 26 to close the orifice 14 and to begin a new plastification phase in which the screw 16 is again retracted while masticating the moldable material supplied through hopper 36. The subsequent injection phase introduces a further quantity of fluid plastic material into the cavity 13.

When, after the necessary number of injection strokes, the mold 11, 12 is completely filled, mold portion 12 shifts slightly toward plate 31 as the cavity expands under pressure of the injected mass. This trips the switch 37 which now modifies the previous sequence of operations so that gate 17 is not reopened and piston 20 is not advanced again until the mass in the mold has hardened and the mold has been opened and reclosed. To expedite the hardening if the material in cavity 13 is of the heat-curable type, switch 37 raises the temperature control 30 apart from acting upon the mold drive, the gate control 18 and the injection control 26. The next injection cycle is then initiated in the aforedescribed manner for the molding of another article.

In FIG. 2 we have illustrated diagrammatically the sequence of steps set forth above. The graph of FIG. 2 represents the degree of filling (in percentage of mold volume) plotted against time (in seconds). According to this graph the cycle begins with an injection phase of duration $t_1$ here shown to last for approximately eight seconds. Now, during a considerably longer plasticizing phase $t_2$, feed screw 16 (FIG. 1) rotates and moves backward as the gate 17 is closed. Thereafter, the cycle $t_1 + t_2$ is repeated two more times, followed by a final injection phase, whereupon curing is initiated at the end of an overall operating interval $t_3$ of slightly more than 130 seconds, measured from the first injection. It will be noted that each injection accounts for 25 percent of the mold volume.

At some time after the end of operating interval $t_3$, depending upon the length of the curing period and the time required for the discharge of the molded article and the subsequent reclosure of the mold, the rotation of screw 16 is restarted to begin a new plasticizing phase preparatorily to injection of the first fractional charge of the next molding operation into the cavity 13. With the switch 37 deactivated upon the reclosure of the mold, the temperature of heater 28 has returned to its lower level and the system is again operative in the aforedescribed manner to fill the mold by successive injections.

We claim:

1. In a molding machine including a split mold with complementary portions forming at least one cavity, drive means for opening and closing said mold, an injection cylinder having an outlet orifice leading to the interior of said mold and having an inlet for moldable plastic material, a rotatable and axially reciprocable feed screw in said cylinder, and supply means for delivering said material to said inlet, the combination therewith of operating means effective upon closure of said mold by said drive means for repetitively advancing said feed screw with intervening rotation and concurrent retraction to plasticize said material and to inject the plasticized material into said mold via said orifice in a plurality of cycles each filling only part of said mold, and sensing means responsive to a complete filling of said mold after repeated advances of said feed screw for operating said drive means to open and reclose said mold prior to the next advance of said feed screw by said operating means; said complementary portions being limitedly relatively shiftable under pressure of the injected material in a position of closure and upon filling of said cavity, said sensing means including a switch responsive to such limited relative shifting.

* * * * *